UNITED STATES PATENT OFFICE.

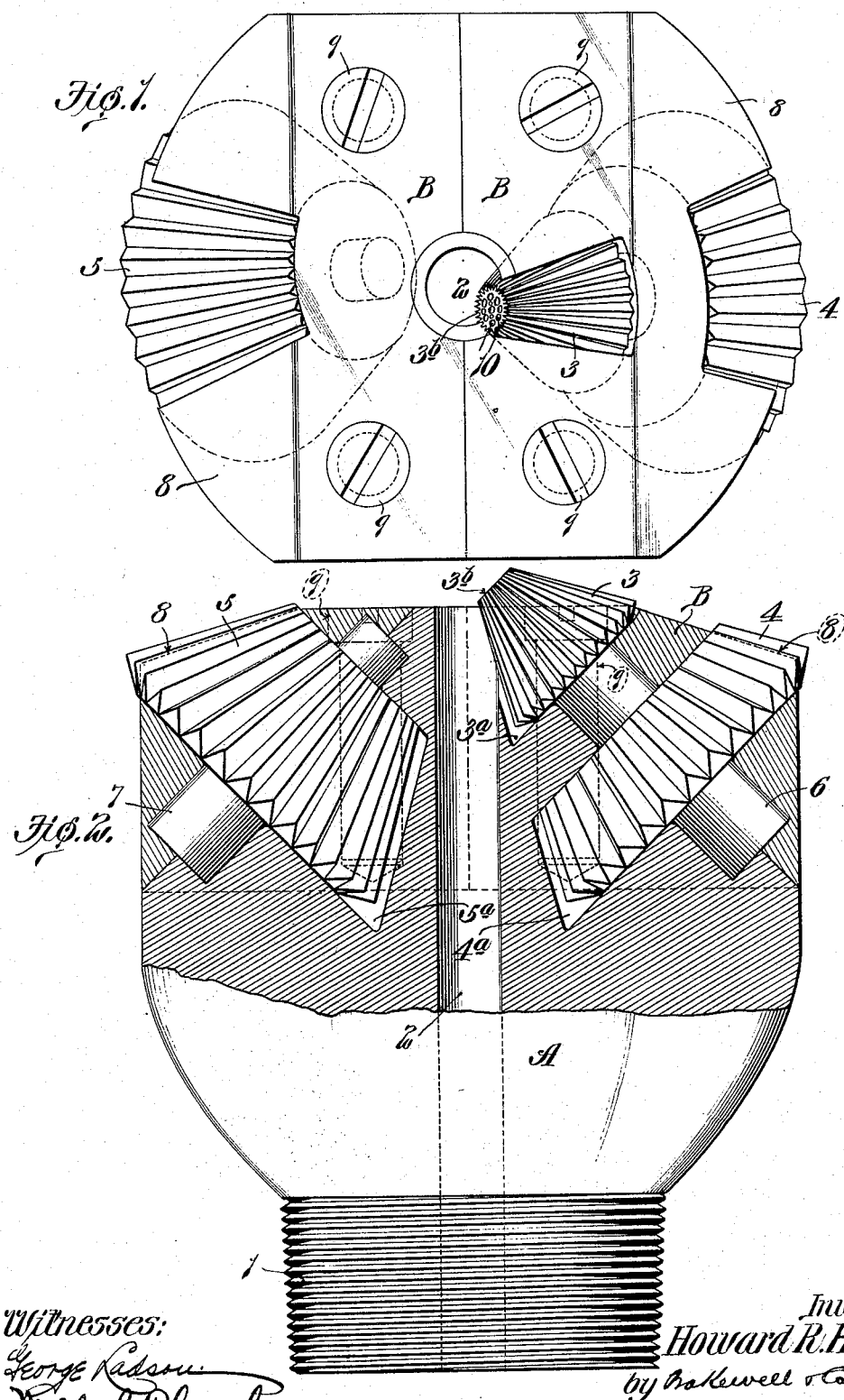

HOWARD R. HUGHES, OF HOUSTON, TEXAS.

DRILL.

No. 930,758.　　　Specification of Letters Patent.　　　Patented Aug. 10, 1909.

Application filed November 20, 1908. Serial No. 463,642.

*To all whom it may concern:*

Be it known that I, HOWARD R. HUGHES, a citizen of the United States, residing at Houston, Texas, have invented a certain new and useful Improvement in Drills, of which the following is a full, clear, and exact description, such as will enable others skilled in the art to which it appertains to make and use the same, reference being had to the accompanying drawings, forming part of this specification, in which—

Figure 1 is a bottom plan view of a drill constructed in accordance with my invention; and Fig. 2 is a vertical sectional view of said drill.

This invention relates to boring drills, and particularly to roller drills such as are used for drilling holes in earth and rock.

The main object of my invention is to provide a drill that is compact and strong and which comprises very few parts that are of suitable dimensions to withstand the strains to which they are subjected even when they are embodied in a drill that is used for boring comparatively small holes as, for example, holes of four inches in diameter.

Another object is to provide a drill consisting of a head and a face plate coöperating with said head to form closed bearings for the trunnions or spindles of a plurality of cutting rollers or bits that project through openings in the face plate, said face plate also acting as a protecting member which prevents pieces of hard material from becoming wedged between the rollers and some rigid obstruction and thus breaking the rollers or damaging them.

Another object is to provide a drill having a head inside of which a number of approximately frusto-conical-shaped cutting members are arranged, the head being so formed that a rigid bearing surface is provided for each of said cutting members to offset or resist the end thrusts to which they are subjected when the drill advances into the material on which it is operating.

Referring to the drawings which illustrate the preferred form of my invention, A designates the head of the drill, and 1 designates a screw-threaded portion on said head for connecting the head to an operating member, not shown, the head being provided with a longitudinally extending bore 2 through which water is forced so as to displace the material that the drill disintegrates or pulverizes. The head A is preferably flattened on two of its oppositely disposed sides, as shown in Fig. 1, so that it will not completely fill the cylindrical-shaped hole that the cutting members on the head form in the material on which the drill operates, thus producing a clearance for any pieces of material that are dislodged but which are too hard to be pulverized or disintegrated by the cutting members.

A plurality of approximately frusto-conical-shaped rollers or cutting members are mounted in the head A for grinding up or disintegrating the material through which the drill is being forced, and in the preferred form of my invention as herein shown, said head is provided with three cutting members 3, 4 and 5 whose axes extend at an angle to the bore 2 or longitudinal axis of the head A so that the cutting surface of said members will form a portion of the end face of the head. In the construction herein shown the cutting members are provided with chisel teeth but, if desired, the cutting members could be provided with pyramidal-shaped projections such as those in the drill bits now in use.

The cutting members or rollers 3 and 4 turn about the same axis and the member 3 is smaller than the member 4 and is spaced away therefrom, as shown in Fig. 2, the cutting member 5 being staggered relatively to the cutting members 3 and 4 or arranged in such a position that it will act upon the same surface that the cutting member 4 operates upon and also upon the surface that lies between the paths in which the cutting members 3 and 4 travel. The cutting members 3 and 4 are mounted in one side of the head A, and the cutting member 5 is mounted in the opposite side of said head, and said members are preferably so disposed that their axes extend tangentially or to one side of the vertical axis of the head, as shown in Fig. 1, instead of extending radially from the vertical axis of the head. I prefer to arrange the cutting members in this manner so that their cutting teeth will have a shearing action on the material through which the drill is forced, but, if desired, the cutting members could be arranged so that their axes extended radially from the longitudinal axis of the head and thus cause the cutting members to have a true rolling action on the surface which they engage or bear upon.

The cutting members 3 and 4 are preferably formed integral with the spindle 6 that is journaled in bearings formed in the head A and in a coöperating face plate or end plate B connected to said head, the cutting member 5 also being provided with integral trunnions 7 that are journaled in bearings formed in said head and face plate. The head is cut away so as to form pockets 3ᵃ, 4ᵃ and 5ᵃ that receive the cutting members 3, 4 and 5, respectively, and the face plate B is provided with slots or openings through which said cutting members project a slight distance beyond the outer surface of said face plate. The central portion of the outer or end bearing face of the face plate B is flat and of rectangular-shape, as shown in Fig. 1, and the other portions 8 of the outer surface of said face plate are also flat but they are inclined upwardly from said central portion, as shown in Fig. 2 so as to produce a tapered end bearing face. The end face of the head A, with which the face plate B coöperates, is tapered, as shown in Fig. 2, and the inner surface of said face plate conforms to the shape of said head so as to snugly embrace same, the face plate preferably consisting of two sections that are connected to the head by a number of screws 9. The cutting members are so disposed that they form a hole having a tapered bottom from the center of which a small conical-shaped core projects, the end face 3ᵇ of the cutting member 3 forming said core and gradually breaking or pulverizing same as the drill advances into the earth or rock in which it is operating. I prefer to provide the end face 3ᵇ of the cutting member with a number of holes 10, as shown in Fig. 1, whose edges form cutting surfaces. The cutting members 4 and 5 project slightly beyond the periphery of the head A so as to form a hole of greater dimensions than said head and thus provide a clearance for the disintegrated or pulverized material that is washed out of the hole by the water forced through the longitudinal bore 2 in said head.

The main advantage of a drill of this construction is that it comprises very few parts, all of which can be made large enough to withstand the strains to which they are subjected when the drill is used for boring small holes. That is to say, that by constructing the drill in the manner above described, I can build a drill that can be used to form small holes, say, for example, a hole four inches in diameter, because the head is provided with only three cutting rollers which can be made large enough to prevent them from breaking when they come in contact with a hard substance. The drills of this general type which have heretofore been in use comprised a great many parts so that it was practically impossible to use the drills for boring small holes for the parts would have to be made so small that they would not withstand the strains to which they were subjected.

Another advantage of my improved drill is that the spindles or trunnions for the cutting rollers are completely incased in practically a solid head so that the rollers will not be bent or displaced when they are subjected to excessive strains. In view of the fact that only a portion of each roller projects a slight distance beyond the outer surface of the face plate, it will be impossible for pieces of hard material to become wedged between the rollers and a rigid obstruction and thus break the rollers off the head, the face plate also preventing the rollers from cutting too deep into the material.

Another advantage of incasing the trunnions or spindles for the cutting rollers in this manner is that it prevents dirt and grit from collecting on said trunnions and thus causing them to wear away quickly. And still another advantage of mounting the cutting members in the manner above described is that the upper end or base end of each cutting member bears directly upon a solid surface; namely, the walls of the pockets in the head and face plate, that resists the end thrusts to which the cutting members are subjected as the drill advances into the material.

Having thus described my invention, what I claim as new and desire to secure by Letters Patent is:

1. A drill consisting of a head provided with pockets and bearings, frusto-conical-shaped cutting members arranged in said pockets and provided with trunnions that are journaled in said bearings, and a face plate connected to said head to form the end bearing face of the head and provided with openings through which portions of said cutting members project slightly; substantially as described.

2. A drill consisting of a head provided with a tapered end bearing face, a spindle journaled in said head and arranged at an angle to the longitudinal center of the head, a pair of frusto-conical-shaped cutting members of different dimensions formed integral with said spindle and having portions of their cutting surfaces projecting slightly through openings in said end bearing face, and a third angularly-disposed frusto-conical-shaped cutting member journaled in said head and projecting slightly through an opening in the end bearing face, said third cutting member being arranged in such a position that it operates upon the surface that lies out of the path of movement of either of the cutting members first referred to; substantially as described.

3. A drill consisting of a head having a tapered end face in which pockets and bearings are formed, frusto-conical-shaped cutting members arranged in said pockets and provided with spindles that are journaled in said bearings, and an end bearing plate conforming to the end face of said head and completely incasing the spindles on said cutting members, said end bearing plate being provided with slots or openings through which the cutting members project slightly and also having bearings in which the spindles of the cutting members are journaled.

4. A drill consisting of a head having a longitudinal bore through which a liquid is forced to flush out the hole that the drill forms in the material, and three frusto-conical-shaped cutting members journaled in said head and arranged in such positions relatively to each other that they will form a cylindrical-shaped hole, one of said cutting members having teeth that shear off the material from the side of the hole being formed.

5. A drill provided with a head having a tapered end face, two parallel flat side faces and two curved side faces arranged between said flat side faces, said tapered end face and side faces having openings, and a plurality of frusto-conical-shaped cutting members journaled in said head and projecting slightly through the openings in said tapered end face and said curved side faces; substantially as described.

6. A drill comprising a head having an end face that is provided with a flat central portion and two portions that incline upwardly therefrom, said flat portion and inclined portions having openings formed therein, and a plurality of frusto-conical-shaped cutting members journaled in said head and projecting through the openings in the flat central portion and in the inclined portions of said end face; substantially as described.

7. A drill consisting of a head provided with a plurality of cutting members of frusto-conical-shape that have longitudinally extending chisel teeth, pockets in said head for incasing all but slight portions of each of said cutting members, said cutting members being arranged in such a position that the teeth thereof have a shearing action upon the material on which the drill operates, and a bore extending longitudinally through said head so as to enable the hole to be flushed out; substantially as described.

8. A drill consisting of a head provided with a longitudinal bore and having a number of pockets and bearings, a plurality of frusto-conical-shaped cutting members arranged in said pockets and provided with trunnions that are journaled in said bearings, said cutting members being staggered relatively to each other, and a plate connected to said head to form the end bearing face of the head and also incase said trunnions, said end plate being provided with slots or openings through which portions of said cutting members project slightly; substantially as described.

9. A drill consisting of a head having a longitudinal bore formed therein for receiving a liquid so as to flush out the opening which the drill forms, a spindle journaled in said head and provided with a pair of integral frusto-conical-shaped cutting members that are spaced away from each other, a third frusto-conical-shaped cutting member journaled in the opposite side of the head and provided with trunnions that are journaled in bearings in said head, and a face plate connected to said head to form the end bearing face of the head and also journals for said trunnions, said end plate being provided with slots or openings through which portions of said cutting members project slightly; substantially as described.

10. A drill comprising a head provided with pockets, approximately frusto-conical-shaped cutting members mounted in said pockets and arranged with their axes converging toward the longitudinal center of the head, and a face plate connected to said head for retaining the rollers in said pockets.

11. A drill comprising a head provided with pockets, approximately frusto-conical-shaped cutting members mounted in said pockets and arranged with their axes converging toward the longitudinal center of the head, and a face plate connected to said head for retaining the rollers in said pockets, the peripheral edge of one of said cutting members projecting beyond the side face of the head so as to form a hole of greater diameter than the head.

12. In a drill, a head having an end bearing face and a pocket that terminates in an opening in said bearing face, and a rotatable cutting members arranged in said pocket and having a portion of its cutting surface projecting through said opening, said pocket conforming to the shape of said cutting member so that portions of said member bear against some of the walls of said pocket.

13. In a drill, a solid head having an end bearing face and a pocket that terminates in an opening in said bearing face, and an approximately frusto-conical-shaped roller arranged in said pocket and having a portion of its periphery projecting through said opening, said pocket conforming approximately to the shape of said roller so that the end faces of the roller will bear against the walls of said pocket.

14. In a drill, a head composed of a plurality of parts, coöperating recesses formed in the meeting faces of said parts to form a closed bearing, a spindle mounted in said bearing and having its end portions completely incased by the parts of the head, and a cutting member carried by said spindle.

15. In a drill, a head consisting of a member that is provided with a pocket and also bearings that project laterally from said pocket, a roller arranged in said pocket, a spindle for said roller mounted in said bearings, and an end plate connected to said member and provided with coöperating bearings for receiving the spindle and also an opening or slot for receiving said roller.

In testimony whereof I hereunto affix my signature in the presence of two witnesses, this seventeenth day of November 1908.

HOWARD R. HUGHES.

Witnesses:
 WELLS L. CHURCH,
 GEORGE BAKEWELL.